United States Patent [19]

Nakamura

[11] 4,373,256
[45] Feb. 15, 1983

[54] METHOD OF MAKING ROTOR COIL OF CORELESS MOTOR

[75] Inventor: Yoshimitsu Nakamura, Settsu, Japan

[73] Assignee: Matsushita Electric Works, Ltd., Osaka, Japan

[21] Appl. No.: 195,054

[22] Filed: Oct. 8, 1980

Related U.S. Application Data

[63] Continuation of Ser. No. 904,866, May 11, 1978, Pat. No. 4,236,295.

[30] Foreign Application Priority Data

May 18, 1977 [JP] Japan .................................. 52-57873

[51] Int. Cl.³ ............................................ H02K 15/02
[52] U.S. Cl. ......................................... 29/598; 72/398
[58] Field of Search .................. 29/598, 597; 310/266, 310/268, 42; 72/355, 398, 401, DIG. 2

[56] References Cited

U.S. PATENT DOCUMENTS

| | | | |
|---|---|---|---|
| 3,348,183 | 10/1967 | Hodges et al. | 29/605 X |
| 3,793,548 | 2/1974 | Faulhaber | 210/266 |
| 4,048,713 | 9/1977 | Hvass | 29/605 X |
| 4,099,077 | 7/1978 | Maekawa | 310/266 X |
| 4,236,295 | 12/1980 | Nakamura | 29/598 |

Primary Examiner—Carl E. Hall
Attorney, Agent, or Firm—Burns, Doane, Swecker & Mathis

[57] ABSTRACT

A method of making cylindrical rotor coil for use in coreless motors is provided whereby the coil is of a reduced thickness with compressed coil turns enabling the stator magnetic gap distance to be reduced, thus enabling a higher flux density to be utilized highly efficiently in the gap. A radially inward force is applied to a cylindrically wound coil of an insulation coated wire so as to act against the outer periphery of the cylindrical coil, whereby respective turns of the wire are compressed together and flattened on their portions defining the respective peripheries. The force application is preferably repeated while varying the relative position of the cylindrical coil in its peripheral directions to the applied force. A mandrel is inserted into the coil before the coil is compressed. The outer diameter of the mandrel is less than the inner diameter of the coil so that the inner and outer diameters of the coil is compressed radially inwardly against the mandrel. The axial ends of the coil are engaged by flat surfaces during the radial compression, to flatten such axial ends.

2 Claims, 8 Drawing Figures

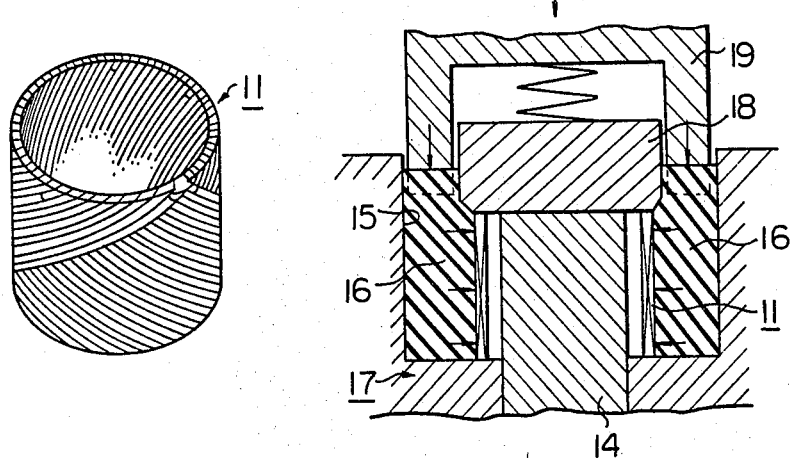
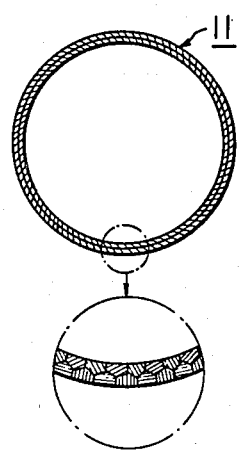
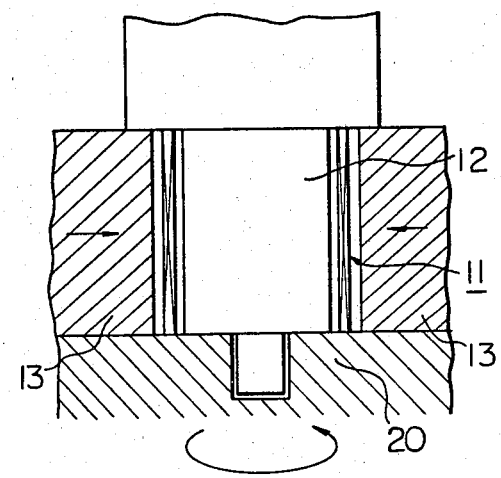

METHOD OF MAKING ROTOR COIL OF CORELESS MOTOR

This is a continuation, of application Ser. No. 904,866, filed May 11, 1978 which has issued on Dec. 2, 1980 as U.S. Pat. No. 4,236,295.

This invention relates to a method of making a cylindrical rotor coil of a coreless motor and, more particularly, to a method of making an improved rotor coil of the type which is cylindrically wound and rotatably disposed in a cylindrical magnetic gap of a stator arrangement of the coreless motor.

In order to achieve highly efficient performance characteristics of the coreless motor, it is necessary to make the magnetic gap between an axial magnetic pole member on one hand and a yoke encircling the member to form the stator arrangement therewith on the other hand to be as small as possible. Thus, the magnetic flux density, which is determinative of the electromotive force for causing the rotor coil to be rotated in the gap, will be as high as possible. On the other hand, the rotor coil is formed generally by an insulation coated copper wire of circular section which is wound into a cylindrical shape by diagonally folding back insulation at respective axial end edge portions of the cylindrical shape to sequentially form respective inner and outer coil layer turns running diagonally from one end edge to the other while intersecting at right angles the other layer turn. Therefore, while the thus wound coil is subjected to a shaping process for reforming it to be precisely a cylindrical shape, there remains a certain volume of spaces between the respective adjacent coil turns of the wire of circular section. Since the axial pole member and yoke of the stator have to oppose each other through a coil thickness involving such spaces, it is practically impossible to render the magnetic gap effectively smaller. For this reason, it has been proposed, for example, that a permanent magnet capable of providing a higher magnetic flux density be employed as the stator pole member, or that the rotor coil be made of multiple layers, more than two, for increasing the coil turns and thus increasing the density of wound turns of the coil itself, and so on. However, in the case of the higher flux density magnet, manufacturing costs of the entire motor are increased by the magnet itself since the same is more costly than usual magnets and, yet, dimensions of the motor cannot be minimized because of the useless spaces involved in the coil. In the case of the multiple layered coil, too, a required higher amount of the coil wire renders the manufacturing costs to become higher while the dimensional minimization is still unattainable due to increased thickness of the coil. The present invention has been suggested in view of these defects of conventional coreless motors.

Accordingly, the present invention has successfully removed the defects by shortening the spaces between the respective coil turns, whereby the coil turn density is increased and consequently the stator magnetic gap can be made smaller so that a higher magnetic flux density will be more efficiently utilized by the increased density coil.

A primary object of the present invention is, therefore, to provide a method of making a cylindrical rotor coil of a coreless motor capable of a higher performance and yet at inexpensive cost, whereby the coil has an improved coil winding density and with a minimized stator magnetic gap.

Another object of the present invention is to provide a method of making the rotor coil which enables it possible to minimize the dimensions of the coreless motor in which the rotor coil is used.

A related object of the present invention is to provide a method of making the rotor coil which is suitable for use in a smaller coreless motor achieving a higher performance.

Other objects and advantages of the present invention shall be made clear upon reading the following detailed descriptions of the invention with reference to preferred embodiments thereof shown in accompanying drawings, in which:

FIG. 5 is a perspective view of the cylindrically wound coil in a state after processed according to the present invention;

FIG. 6 is a cross section of the coil shown in FIG. 5 with a part thereof shown in an enlarged scale; and FIGS. 7 and 8 respectively show in a vertically sectioned view the other embodiment of the method according to the present invention.

Figure 1:
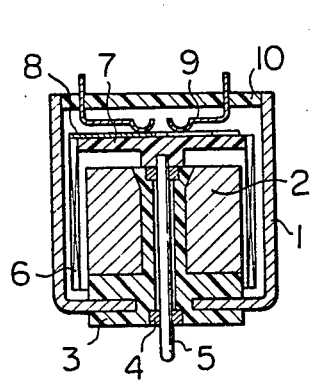
FIG. 1 is a vertically sectioned view of a coreless motor in which the rotor coil according to the present invention is employed.
Figure 2:
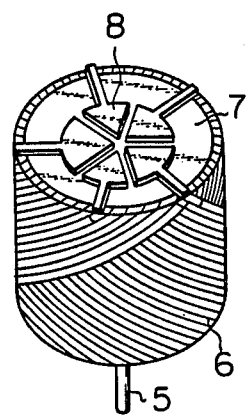
FIG. 2 is a perspective view of the rotor coil as disassembled from the motor of FIG. 1.

Referring now to the coreless motor employing the rotor coil made according to the present invention with reference to FIGS. 1 and 2, a substantially cup-shaped stator yoke 1 acting as a motor housing accommodates therein an axial magnetic pole member 2. The pole member comprises a cylindrical permanent magnet and is secured to the bottom of the cup-shaped yoke 1 by means of a fixing member 3 which extends over the length of an axial bore of the cylindrical magnet 2 and out of the bottom of the yoke 1 to secure the magnet to the yoke. The member 3 includes an axial hole which receives an axial rotary shaft 5 of a cylindrical rotor coil 6 and which is supported by a pair of shaft bearings 4 of a non-magnetic material. The rotary shaft 5 and rotor coil 6 are coupled integrally by means of a disk member 7 of an electrically insulative and non-magnetic material. The disk member 7 is secured to an axial end opening of the cylindrical coil 6 while supporting at its inner center an end of the shaft 5, and the cylindrical coil 6 is disposed in a cylindrical magnetic gap formed between the inner peripheral wall of the yoke 1 and the outer peripheral wall of the axial pole member 2 in coaxial relation to the yoke 1 and member 2 so as to be rotatable with the rotary shaft 5 as the center. On the outer surface of the disk member 7, there are secured a plurality of commutator segments 8, which are separated from each other and extend radially from the central area of the disk member 7 to a position above the axial end of the cylindrical coil 6 at such axial end, the folded-back coil wire, which is wound into the cylindrical shape in the manner as already referred to in the foregoing, is preliminarily processed to expose the inner copper wire with the insulation coating removed at equally separated positions on the particular end of the cylindrical coil 6, and the extended end of the respective segments 8 is electrically connected to the exposed copper wire of the coil, as by being soldered thereto. A pair of contactor brushes 9 secured to a closure disk 10 closing the open end of the cup-shaped yoke 1, are brought into a slidable contact with the commutator segments 8 for feeding an electric current to respective sections of the coil divided between the respective positions of the exposed inner wire.

Figure 3:
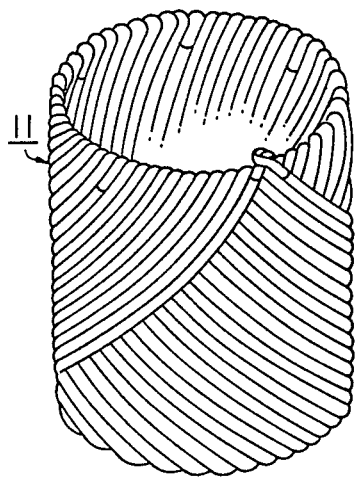
FIG. 3 is a perspective view of a cylindrically wound coil in a state before processed according to the present invention.

An embodiment of the method according to the present invention shall now be explained with reference to FIGS. 3 and 4. In FIG. 3, there is shown a cylindrical coil 11 of the insulation coated copper wire wound by any known winding method in the manner already referred to. The copper wire is preliminarily exposed at a plurality of positions by removing the insulation coating, which positions are disposed at the axial one end edge of the cylindrical shape of the coil 11. It will be seen in the drawing that respective starting and terminating ends of the wire are also processed to the preliminary coating removal and twisted together, and the twisted ends are soldered and smoothed for being utilized as one of the plurality of positions where the commutator segments are connected to the exposed wire at a later stage. Instead of the preliminary coating removal at the plurality of positions as in the present instance, it is of course possible to remove the coating after the wire is wound into the cylindrical coil, at the respective positions of the axial end edge, or even over the entire edge for directly slidably engaging the contactor brushes to the wire exposing edge of the coil. In any event, the coil 11 just after being wound into the cylindrical coil shape is somewhat loose in the shape and is thus processed to a precise cylindrical shaping, but there still exist spaces between the respective adjacent turns of the coil, rendering the thickness of the inner and outer coil layers to be somewhat bulky as schematically shown in section of FIG. 4.

Figure 4:
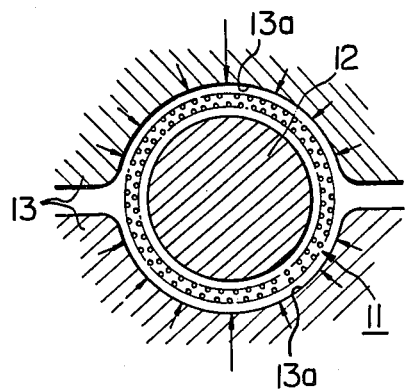
FIG. 4 shows in a sectioned view an embodiment of the method according to the present invention.

Now, according to the present invention, as shown in FIG. 4, the cylindrically wound and shaped coil 11 is further subjected to a pressing step for achieving a higher coil winding density, in such manner that a columnar mandrel 12 of a diameter slightly smaller than the inner bore of the coil 11 is inserted in the hollow space thereof. At least two converging pressure dies 13, respectively having a semi-cylindrical recess 13a defining a cylindrical space of a diameter slightly larger than the diameter of the mandrel 12 when the dies engage each other to align their recesses, are fitted around the coil 11, the dies 13 are converged toward the center of the mandrel 12 so that respective inner surfaces of the recesses 13a will press the coil 11 against the periphery of the mandrel 12 concentrically therewith, and such convergent pressing is preferably repeated several times while rotating the mandrel 12 or the coil 11 about the axis of the mandrel as the center in either peripheral direction or reciprocally. Through this pressing step, the entire diametral dimension of the cylindrical coil 11 is reduced, removing the spaces between the respective adjacent coil turns. Thus, the thickness at the inner and outer coil layers of the coil is also reduced, resulting in that the inner and outer peripheral surfaces are flattened as shown in FIG. 5 or in FIG. 6, with the coil wire at the respective turns deformed from the original circular cross-sectional shape substantially to a pentagonal shape as shown in FIG. 6. The wound turn density of the coil is made practically and effectively high along the entire periphery of the cylindrical coil.

It will be appreciated that the both axial end surfaces of the cylindrical coil can be also flattened during the above pressing step if the convergent pressing is performed between a pair of parallel flat walls arranged in any proper manner to abut the respective axial ends of the coil, and further that, while the use of the two converging pressure dies 13 is referred to in the foregoing, the similar dies divided into more than two which are converged in many radial directions more than two should preferably be used in order to achieve a higher circularity precision of the coil. Further, instead of the convergent type pressing employed in the present embodiment, a bulging type pressing in which a plurality of dies disposed inside the cylindrical coil and expanded in all radial directions toward a stationary circular wall of a bore of an outer die fitting around the coil tightly may also be utilized and, in this case, the outer die should preferably be divided into many sections which are slightly converged so that the same effect as in the present embodiment can be achieved.

In FIG. 7, there is shown another embodiment of the method according to the present invention, in which a columnar mandrel 14 is disposed at the center of a cylindrical recess 15 made in a die 17. The mandrel 14 is of a diameter slightly smaller than that of the coil 11 and, conveniently, penetrates through the die 17 to extend in the recess 15 to a height substantially equal to that of the coil 11 so as to preferably prevent any axial expansion of the coil due to the pressing, for achieving the high wound turn density of the coil. The recess 15 is of a bore enough larger than the diameter of the coil 11 for defining a cylindrical space around the mandrel 14. The cylindrical coil 11 is fitted around the mandrel 14, then a cylindrical member 16 made of such resilient substance as urethane rubber is fitted in the cylindrical space between the peripheral wall of the coil 11 and opposing peripheral wall of the recess 15 to a level higher than the height of the coil. A stopper 18 is placed on the upper edges of the coil 11 and mandrel 14, and thereafter a substantially cup-shaped punch 19 is placed on the resilient member 16 at a ring-shaped end edge of the punch 19 and is depressed to compress the resilient member 16 in its axial direction. The member 16 is thus urged to bulge only in inward radial directions, as its outer periphery is restricted by the peripheral wall of the recess 15, and the coil 11 is compressively pressed against the outer periphery of the columnar mandrel 14 by such inward bulging force of the member 16. As the stopper 18 placed above the coil 11 is adapted to receive the depressing force of the punch 19 through a spring or the like, the stopper 18 urges the coil 11 not to expand in its axial direction but only to the radial inward directions so that the wound turn density of the coil will be effectively made high while being flattened at the inner and outer peripheries and both axial end surfaces.

In this second embodiment, it may be possible to employ a columnar resilient member instead of the mandrel 14 so as to be placed on a closed flat bottom of the recess 15 of the die 17, with the inner periphery of the recess 15 and outer periphery of the member 16 intimately abutting the outer and inner peripheries of the coil 11, respectively, and to depress the member 16 for causing the member to bulge in outward radial direction and thus the coil 11 to be pressed against the inner periphery of the recess 15 to achieve substantially the same effects as above.

FIG. 8 shows a further embodiment of the method according to the present invention. In this embodiment, the cylindrical coil 11, columnar mandrel 12 and converging type pressing dies 13 employed in the first embodiment are placed on a flat filing die 20 having file teeth at least in an area on its surface abutting an axial end edge of the coil 11. The other end edge of the coil is butted against a flange of the mandrel 12 defining the height of the mandrel to be equal to that of the coil, and the converging dies 13 are converged toward the mandrel 12 and between the flange of the mandrel 12 and the filing die 20 to compressively urge the coil 11 to be pressed against the periphery of the mandrel 12. Dimensional relations between the coil 11, mandrel 12 and dies 13 are the same as in the case of the first embodiment of FIG. 4 to achieve the high wound turn density of the coil by the converging type pressing. Then, in a state of holding the thus processed coil 11 by the mandrel 12 and converged dies 13, the filing die 20 is rotated about an axial boss extending from the mandrel 12 as the center, whereby the end edge of the coil 11 abutting the file teeth of the die 20 is ground off by the teeth rotated and the insulative coating of the coil wire is removed at the end edge to expose the inner conductive copper wire which is even slightly ground off to provide a flat end edge of exposed conductive wire of the coil. With this grinding, the cylindrical coil can be made adaptable to a use in a motor in which the electric current supplying brushes are brought into direct slidable contact with the flat end edge of the exposed conductive wire of the coil without the commutator segments.

In this third embodiment, it may be also possible to reciprocally slide the filing die 20, instead of rotating it.

According to the present invention, as has been disclosed, the pressing force is applied to the cylindrically wound rotor coil so as to act in radial directions of the coil against at least one of its inner and outer peripheries, so that the spaces between the respective adjacent coil turns will be effectively removed by compressively arranging the respective turns. At the same time, the coil wire, originally of circular section is deformed to be flat on the inner and outer peripheries of the cylindrical coil, whereby the thickness in the inner and outer turn layers is effectively made smaller. Therefore, the present invention establishes such effects that:

(a) It is possible to bring the inner periphery of the stator yoke and the outer periphery of the permanent magnet closer to each other to thereby make the magnetic gap smaller, so that a higher magnetic flux density can be provided to the rotor coil even by the permanent magnet of the same magnetic characteristics.

(b) By the compressive coil turn arrangement, the wound turn density of the coil can be made high as to be substantially the maximum, so that the higher flux density achieved as in (a) above can be effectively utilized at a high efficiency.

Relative to the above effects (a) and (b), an experiment made by the present invention has shown that a cylindrically wound coil having a thickness of 1.1 mm before processed to the pressing step of the present invention was made to be of 0.7 mm thick by the pressing according to the present invention. As a consequence of an eventual reduction of the magnetic gap distance enabled by such thickness reduction of the coil, the coreless motor prepared by employing such coil as the rotor has achieved an output about two times as large as that of a motor employing a rotor coil not processed according to the present invention.

(c) Accordingly, as long as a motor output of the same level as that of conventional motors is required, it is possible to employ a permanent magnet of a smaller diameter or dimension than in the case of the conventional motors, whereby the stator yoke or motor housing acting as the yoke can be made smaller depending on the dimensional reduction of the magnet, so that an effective minimization of the coreless motor can be well achieved with less manufacturing costs.

What is claimed is:

1. In a method of making a cylindrical rotor coil for use in a coreless electric motor, wherein a substantially cylindrical coil is formed from an insulation coated conductive wire by diagonally folding back the wire at respective axial and edge portions of a cylindrical shape to sequentially form respective inner and outer coil layer turns running diagonally from one end edge to the other while intersecting at an angle the other layer turn, the improvement wherein said coil is compacted by the steps of:

positioning within said coil is mandrel having an outer diameter smaller than an inner diameter of said coil, and applying pressure to said coil in radial inward directions against an outer periphery of said coil while maintaining flat rigid die surfaces in abutting relationship with both axial ends of said coil, to generally flatten the portions of said wire defining inner and outer peripheries of said coil and to radially inwardly compress together the turns of said coil against said mandrel for reducing the radial thickness of said coil and reducing the inner and outer diameters of said coil.

2. A method according to claim 1 including the step of changing the rotational position of said compressed coil relative to the radial inward pressure and repeating said applying step.

* * * * *